(12) United States Patent
Beach

(10) Patent No.: X3845
(45) Date of Patent: Apr. 9, 1824

(54) PLOUGH, SELF-SHARPENING

(76) Inventor: Waldron Beach

Waldron Beach

Letters Patent

The Schedule referred to in these Letters Patent and making part of the same containing a description in the words of the said Waldron Beach himself of his improvement on Bergen's Self Sharpening Plough "Bergen's self sharpening plough for which this is an improvement is described as follows. That part of Ploughs which is forms the cutting part is that which separates or cuts the earth asunder before it arrives at the mould board. and is commonly called the share. In most Ploughs the share is in one part. but in this it is divided and distinguished by point and share. the point extends about three inches ahead of the share & is so formed that it may be reversed or turned upside down. the top and under part thereof being precisely the same and tapering to the point and similar to a wedge. it is jogged in to fit up to the mould board. and fastened thereto by a screw bolt with a nut below the jog on the opposite side allowing room sufficient for that purpose. The sides thereof are formed with grooves to admit the share. and the back end thereof jogged in to fit up to the land side to which it is also fastened by a screw bolt in a horizontal direction The share is also formed in such a manner that it can be reversed or turned end for end. the opposite side being precisely the same. the ends thereof are so formed as to let into the point which hath grooves as above stated for that purpose. and catching or hooking to the mould board at the back end. it is also jogged in to fit up to the mould board and fastened thereto by a screw bolt. the mould board is formed by applying a true curve to the upper edge thereof. the diameter of which curve is taken from a curve which a sod forms when broken or detached from the earth by a plough and the edge of that curve to touch every part of the Plane. the other way by applying a straight edge to it in such a manner as to correspond to the end of a sod cut off at a right angle to the land side. and that side running on a mould board."

The castings are connected to the beam by an iron bar fastened to the mould board by a screw bolt and extending from that to the bolt which connects the land side to the mould board. which has a projection back (on the inside of the land side) for that purpose. and from that to another bolt before mentioned which connects the land-side to the point. and fastened at the top of the beam by a nut and screw. this bar is also braced by another bar of iron rivetted to it below the beam and extending from that to the bolt which connects the land side to the tail. it is also fastened to the beam by a bolt passing through the mould board in front of the above mentioned bar and between the land side and the projection of the mould board before mentioned secured with a head on the inside below and a screw cut to the top of it to admit a nut above and below the beam." The object of the improvement in this Plough is to sharpen itself. All Plough shares wear mostly from below which causes the edge to incline upwards and the Plough becomes dull. this by being reversed turns the edge which was worn up down and restores it to its primitive situation which may be repeated several times before it will be necessary to get it renewed. which can be done at a very trifling expense. The point being made of wrought iron can be laid with steel for about 37 1/2 cents. the share being of cast iron will cost about 30 cents. Thus it may plainly be seen that an immense trouble and expense will be saved to the farmer as they will seldom be under the necessity of going to the blacksmith."

The improvements consist of the following particulars, to wit; The share is formed similar to the above description except that the edge or cutting part is straight and the tenons which fit into the mortise or groove in the point are placed transversely or obliquely so that the tenon which comes in contact with the point will be at the top of the share. The mortises on the sides of the point are placed in an oblique or transverse direction so as to fit the said tenons and lay the share in a straight line with the point. The sheath or standard is made of cast iron and attached to the mould board with a sharp edge or cutter on its front to serve as a substitute for a coulter. Or a coulter of the following construction may be attached at or near the place where the standard and point are connected. That part of the coulter above the point and front of the standard or cutter is of a triangular form and of thickness sufficient to give it the requisite strength. There is a piece or part of the said coulter extending downwards which forms a key and dovetail which secures or locks the point to the standard. If the Plough is used without the coulter a key or dovetail is substituted to secure the point to the standard as aforesaid. Or a two edged coulter the lower end of which will be so constructed as to take the place of the said key or dove tail may extend up to the beam. The piece forming the land side has a rabbit on the inner part to fit to the hinder part of the point. There is a projection on the bottom of the front end of the land side to cover the end of that bolt which is used in the absence of the coulter and key. There are two ribs cast on the inner part of the land side in such manner that they form a socket for the lower end of the handle. There is likewise a pro=

/ section on the lower part of the right side of the mould board which comes in contact with the hinder part of the share and forms a support for the same Rcvd.
M.G.

Witnesses
D. B. Lee
William O. Rhine

Waldron C. Beach (1122 Words)

Patented Aug 25, 1823

DRAFTSMAN'S DIVISION.

*All communications should be addressed to* "The Commissioner of Patents, Washington, D. C."

2—328 *a.*

*DEPARTMENT OF THE INTERIOR,*

United States Patent Office,

*Washington, D. C.,* ........................ , 189...

*SIR:*

*The printed* ............copies.................... *of Patent No.* W Beach Apr 9 1824

...............are............... *exhausted.*

*As soon as printed a copy will be mailed you to complete your order.*

*By direction of the Commissioner:*

*Very respectfully,*

............................................

*Chief Clerk.*

8143b6-97-5m